United States Patent
Sunamoto et al.

(10) Patent No.: US 6,566,516 B1
(45) Date of Patent: May 20, 2003

(54) HIGH PURITY POLYSACCHARIDE CONTAINING A HYDROPHOBIC GROUP AND PROCESS FOR PRODUCING IT

(75) Inventors: Junzo Sunamoto, 1-30-1013, Shibukawa 1-Chome, Kusatsu-Shi, Shiga 525-0026 (JP); Kazunari Akiyoshi, Uji (JP); Ryuzo Hosotani, Tsukuba (JP); Akio Hayashi, Kashiwa (JP); Hiroki Fukui, Tsukuba (JP)

(73) Assignees: NOF Corporation, Tokyo (JP); Junzo Sunamoto, Kusatsu (JP)

( * ) Notice: Subject to any disclaimer, the term of this patent is extended or adjusted under 35 U.S.C. 154(b) by 0 days.

(21) Appl. No.: 09/530,347

(22) PCT Filed: Mar. 31, 1999

(86) PCT No.: PCT/JP99/01683

§ 371 (c)(1),
(2), (4) Date: Apr. 25, 2000

(87) PCT Pub. No.: WO00/12564

PCT Pub. Date: Mar. 9, 2000

(30) Foreign Application Priority Data

Aug. 31, 1998 (JP) .......................................... 10-244671

(51) Int. Cl.⁷ ................................................. C07H 1/00
(52) U.S. Cl. .............................. 536/123.12; 536/123.1; 536/124; 536/127
(58) Field of Search ............................... 536/18.5, 18.6, 536/123.1, 123.12, 124, 127

(56) References Cited

FOREIGN PATENT DOCUMENTS

| EP | WO 9731085 | * | 8/1997 | ............ C11D/1/62 |
| EP | WO 200012564 A | * | 8/2000 | ............ C08B/37/00 |
| JP | 10052502 | * | 2/1998 | ............ A61M/29/00 |
| JP | 2001278729 | * | 10/2001 | ............ A61K/7/00 |

OTHER PUBLICATIONS

Akiyoshi et al., Chemistry Letters (1991), 7, 1263–1266.*

* cited by examiner

Primary Examiner—James O. Wilson
Assistant Examiner—Patrick Lewis
(74) Attorney, Agent, or Firm—Flynn, Thiel, Boutell & Tanis, P.C.

(57) ABSTRACT

A high purity polysaccharide containing hydrophobic group is produced by a process involving a first process step of producing an isocyanate group-containing hydrophobic compound, wherein one mole of a hydroxyl group-containing hydrocarbon having 12–50 carbon atoms or of a sterol is reacted with a diisocyanate represented by OCN—$R^1$—NCO in which $R^1$ is a hydrocarbyl of 1–50 carbon atoms, a second process step of producing the polysaccharide containing hydrophobic group composed of the hydrocarbon group of 12–50 carbon atoms or of the steryl group, wherein the isocyanate group-containing hydrophobic compound obtained in the first process step is reacted with one or more polysaccharides, and a purification step in which the reaction product in the second process step is purified using a solvent based on a ketone.

18 Claims, 4 Drawing Sheets

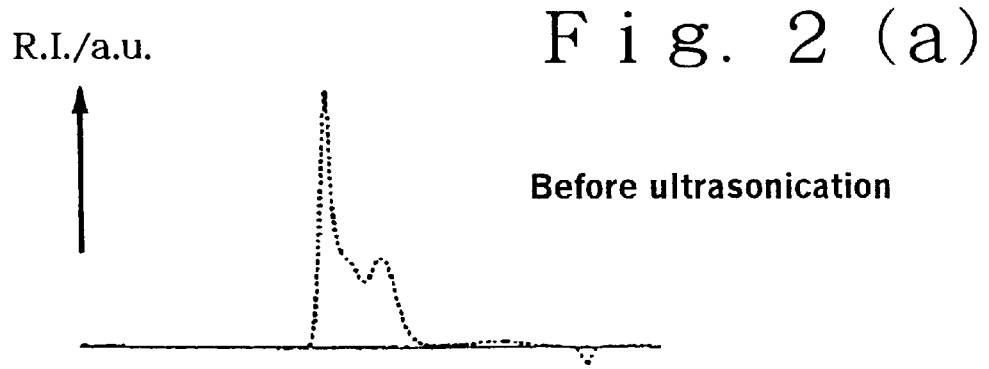
Fig. 2 (a)
Before ultrasonication
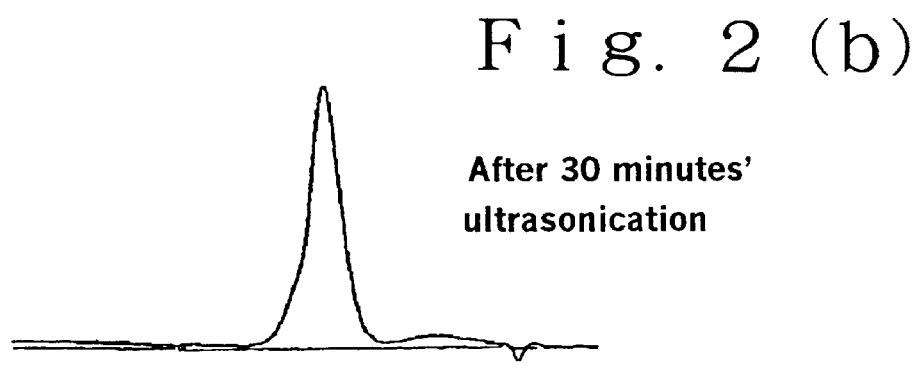
Fig. 2 (b)
After 30 minutes' ultrasonication
Fig. 2 (c)
Supernatant
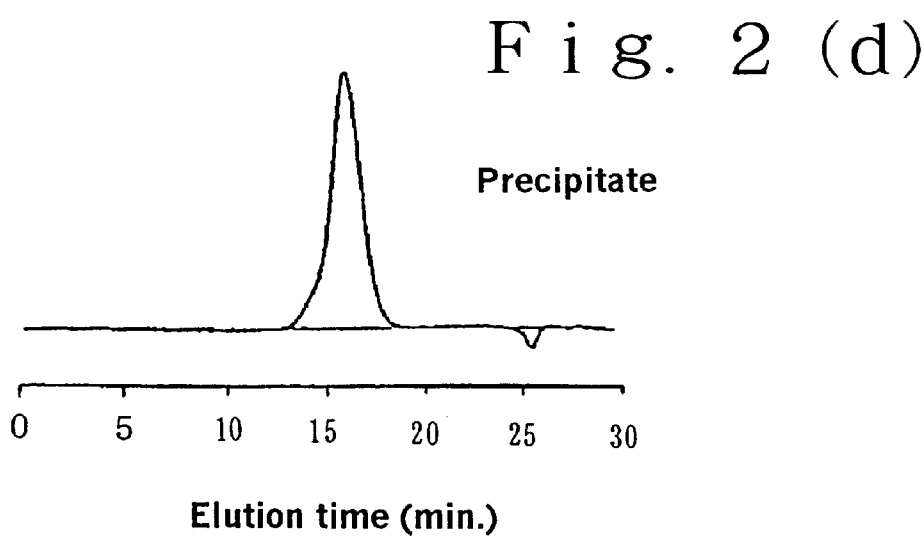
Fig. 2 (d)
Precipitate
Elution time (min.)

Elution time (min.)

# HIGH PURITY POLYSACCHARIDE CONTAINING A HYDROPHOBIC GROUP AND PROCESS FOR PRODUCING IT

FIELD OF THE TECHNIQUE

The present invention relates to a high purity polysaccharide containing a hydrophobic group and to a process for producing it.

BACKGROUND OF THE TECHNIQUE

In water-soluble polymeric substances, there are natural occurring polymeric substances, semisynthetic polymeric products and synthetic polymers. As the natural polymeric substances, for example, carbohydrates, such as starches and marine plant products, mucosubstances, such as gum arabic and the like, and proteins, such as glue and so on. As the semisynthetic polymeric products, there may be enumerated, for example, polymeric cellulose-like substances, such as viscose etc. As the synthetic polymers, there may be exemplified polyvinyl alcohol, polyvinylpyridine and polyglycerol. Some of the polymeric derivatives having hydrophobic groups derived from these water-soluble polymeric substances have now found their applications to medical materials, such as coating material for coating drug carriers which contain drugs. For example, it has been known that, by coating a drug carrier, such as a liposome microcapsule, microsphere, O/W emulsion or erythrocyte ghost, with a hydrophobic group-containing polysaccharide, not only the spontaneous exudation of drug from such a drug carrier is suppressed but also the cell-specific drug transference rate using such a drug carrier is improved.

In particular, those compounds in which the water-soluble polymeric substances are polysaccharides and the hydrophobic group is a steryl group, namely, polysaccharide-sterol derivatives, have already been disclosed as a polysaccharide coating material for liposomes (Japanese Patent Kokai Sho 61-69801 A), as a coating material for fat emulsion (Japanese Patent Kokai Sho 63-319046 A) and as a polymeric surfactant to be used on preparation of a polysaccharide-coated emulsion (Japanese Patent Kokai Hei 2-144140 A) and a technique for synthesizing it has been disclosed in Japanese Patent Kokai Sho 61-69801 A.

It has in recent years been widely accepted that liposome and O/W emulsion are prospective as a drug carrier. It has been reported that the chemical and physical stabilities of a drug carrier of this kind in a living body are improved by coating the drug carrier with a polysaccharide, while thereby a targettropism to a specific cell group is also revealed {Bull. Chem. Soc. Japan, 62, 791–796 (1989)}.

For synthesizing the polysaccharide-cholesterol derivative to be used therefor, a technique has hitherto been employed as described in Japanese Patent Kokai Sho 61-69801 A, which comprises the following three process steps, namely, reacting a polysaccharide with monochloroacetic acid to synthesize a carboxymethylated polysaccharide (the first process step), reacting the carboxymethylated polysaccharide with ethylenediamine to synthesize N-(2-aminoethyl)-carbamoylmethylated polysaccharide (the second process step) and reacting, then, the N-(2-aminoethyl)carbamoylmethylated polysaccharide with cholesteryl chloroformate to synthesize N-{2-(cholesteryloxycarbonylamino)ethyl}-carbamoylmethylated polysaccharide (the third process step).

However, this technique disclosed in Japanese Patent Kokai Sho 61-69801 suffers from a disadvantage that the carboxyl group of the reactant in the second process step is liable to remain unreacted until the end of the process, so that the influence of the negative charge of such remaining carboxyl group on the physicochemical stability, cell-specificity, adaptability and so on of the liposome or the emulsion coated with the polysaccharide cannot be obviated. A still further problem remains in that this technique requires many process steps.

In order to resolve these problems, an alternative technique for the synthesis is proposed in Japanese Patent Kokai Hei 3-292301 A, which comprises reacting a diisocyanate with a sterol in the first step to synthesize a monoisocyanate compound having a steryl group at the α-position at one end of an alkane and an isocyanato group at the ω-position of the other end thereof and reacting the monoisocyanate compound with the polysaccharide in the second step to attain an easy introduction of the steryl group into the polysaccharide.

However, this technique has disadvantages in that (1) the by-product formed by the reaction of one mole of the diisocyanate compound with two moles of the sterol in the first step (in the following, referred to sometimes as the sterol dimer) is not able to be removed completely by a purification technique by dialysis or reprecipitation using ethanol and the sterol dimer will remain in the final product of polysaccharide-sterol derivative as an impurity and that (2) the unsubstituted polysaccharide which has not reacted with the monoisocyanate compound (occasionally referred to as unreacted polysaccharide) in the second step will be present in the final product of polysaccharide-sterol derivative as an impurity.

In using a polysaccharide-sterol derivative for a drug carrier or as a coating material for liposomes, a polysaccharide-sterol derivative of high purity having lower content of by-product is to be expected.

There are detailed reports as to the above-mentioned polysaccharide-sterol derivatives and as to amphiphilic composite products in which a hydrophobic group other than sterol is bound to a water-soluble polymeric substance other than polysaccharide, such as alkyl diesters of polyethylene glycol {Dojin News No. 85, p 3–11 (1997)}.

However, there is no report up to date as to a hydrophobic group-containing water-soluble polymeric substance of high purity, due to existing difficulty in the production of such substance, as mentioned above.

The first object of the present invention is to propose a process permitting production of a high purity polysaccharide containing a hydrophobic group with a low content of impurities, such as an unsubstituted polysaccharide and sterol dimer, in an efficient and easy manner.

The second object of the present invention is to provide a high purity polysaccharide containing a hydrophobic group obtained by the production process mentioned above.

DISCLOSURE OF THE INVENTION

The inventors had performed sound researches in respect of the problems in the prior art given above and reached the discovery that a high purity polysaccharide containing a hydrophobic group was able to be obtained by employing a combination of technical measures of use of a solvent based on a ketone in the reprecipitation process and of purification by means of an ultracentrifugation or of purification with an aprotic polar solvent, whereby the present invention has been completed. Thus, the present invention consists in the high purity polysaccharide containing a hydrophobic group and in the process for producing it as given below:

(1) A process for producing a high purity polysaccharide containing a hydrophobic group, comprising a first process step of producing an isocyanate group-containing hydrophobic compound, wherein one mole of a hydroxyl group-containing hydrocarbon having 12–50 carbon atoms or of a sterol is reacted with a diisocyanate represented by OCN—$R^1$NCO in which $R^1$ is a hydrocarbyl of 1–50 carbon atoms and a second process step of producing the polysaccharide containing hydrophobic group composed of the hydrocarbon group of 12–50 carbon atoms or of the steryl group, wherein the isocyanate group-containing hydrophobic compound obtained in the first process step is reacted with one or more polysaccharides, wherein the reaction product in the second process step is purified using a solvent based on a ketone.

(2) The process as defined in the above (1), wherein the polysaccharide is selected from the group consisting of pullulan, amylopectin, amylose, dextran, hydroxyethyl cellulose, hydroxyethyl dextran, mannan, levan, inulin, chitin, chitosan, xyloglucan and water-soluble cellulose.

(3) The process as defined in the above (1) or (2), wherein the solvent based on a ketone comprises one or more selected from the group consisting of acetone, methyl ethyl ketone, diethyl ketone and diisopropyl ketone.

(4) The process as defined in any one of the above (1) to (3), wherein the hydrophobic group-containing polysaccharide has a group represented by —XH in which X is an oxygen atom or a nitrogen-containing group represented by NY with Y being a hydrogen atom or a hydrocarbyl of 1–10 carbon atoms wherein 0.1–10 —XH groups per 100 monosaccharide units constituting the polysaccharide are replaced by one or more hydrophobic groups represented by the formula (1), namely,

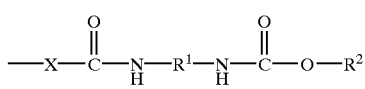
(1)

in which X is the same as given above, $R^1$ denotes a hydrocarbyl having 1–50 carbon atoms and $R^2$ denotes a hydrocarbon group of 12–50 carbon atoms or a steryl group.

(5) The process as defined in the above (4), wherein $R^2$ in the formula (1) denotes a steryl group.

(6) The process as defined in any one of the above (1) to (5), wherein the content of the hydrophobic group-containing polysaccharide in the product purified using the solvent based on a ketone is as high as 80% by weight or more.

(7) The process as defined in the above (6), wherein the content of unsubstituted polysaccharide is as low as 20% by weight or less.

(8) The process as defined in the above (6) or (7), wherein the product has a content of the impurity product, in which both the two NCO groups in the diisocyanate are reacted with the hydroxyl group-containing hydrocarbon having 12–50 carbon atoms or with the sterol, as low as 0.05% by weight or less.

(9) The process as defined in any one of the above (1) to (8), wherein the product purified using a solvent based on ketone is subjected to a further purification by dispersing the product finely in water under an ultrasonic treatment, with subsequent ultracentrifugal separation.

(10) The process as defined in the above (9), wherein the content of the hydrophobic group-containing polysaccharide in the purified product from the ultracentrifugal separation is as high as 98% by weight or more.

(11) The process as defined in the above (10), wherein the content of unsubstituted polysaccharide is as low as 2% by weight or less.

(12) The process as defined in the above (10) or (11), wherein the content of the impurity product, in which both the two NCO groups in the diisocyanate are reacted with the hydroxyl group-containing hydrocarbon having 12–50 carbon atoms or with the sterol, is as low as 0.05% by weight or less.

(13) The process as defined in any one of the above (1) to (8), wherein the product purified using the solvent based on a ketone is further subjected to a purification procedures comprising dissolving the product in an aprotic polar solvent, admixing water to the resulting solution to cause the unsubstituted polysaccharide to be transferred to the aqueous phase and removing the aqueous phase separated by phase separation.

(14) The process as defined in the above (13), wherein the further purification of the product purified using the solvent based on a ketone is performed by dissolving the product in the aprotic polar solvent of an amount of 3–50 times the weight of the product and admixing water with the resulting solution in an amount of at least 5 times the weight of the solution.

(15) The process as defined in the above (13) or (14), wherein the aprotic polar solvent comprises one or more selected from the group consisting of N,N-dimethylformamide, N,N-dimethylacetamide and dimethyl sulfoxide.

(16) The process as defined in any one of the above (13) to (15), wherein the content of the hydrophobic group-containing polysaccharide in the product purified using the aprotic polar solvent is as high as 98% by weight or more.

(17) The process as defined in the above (16), wherein the content of the unsubstituted polysaccharide is as low as 2% by weight or less.

(18) The process as defined in the above (16) or (17), wherein the content of the impurity product, in which both the two NCO groups in the diisocyanate are reacted with the hydroxyl group-containing hydrocarbon having 12–50 carbon atoms or with the sterol, is as low as 0.02% by weight or less.

(19) A high purity product of a polysaccharide containing a hydrophobic group which contains at least 80% by weight of the polysaccharide containing a hydrophobic group, wherein the polysaccharide is one having a group represented by —XH in which X is an oxygen atom or a nitrogen-containing group represented by NY with Y being a hydrogen atom or a hydrocarbyl of 1–10 carbon atoms wherein 0.1–10 —XH groups per 100 monosaccharide units constituting the polysaccharide are replaced by one or more hydrophobic groups represented by the formula (1), namely,

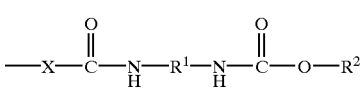
(1)

in which X is the same as given above, $R^1$ denotes a hydrocarbyl having 1–50 carbon atoms and $R^2$ denotes a hydrocarbon group of 12–50 carbon atoms or a steryl group, said polysaccharide containing a hydrophobic group being obtained by a process comprising a first process step of producing an isocyanate group-containing hydrophobic compound, wherein one mole of a hydroxyl group-containing hydrocarbon having 12–50 carbon atoms or of a sterol is reacted with a diisocyanate represented by OCN—$R^1$—NCO in which $R^1$ is a hydrocarbyl of 1–50 carbon atoms, a second process step of producing the polysaccharide containing hydrophobic group composed of the hydrocarbon group of 12–50 carbon atoms or of the steryl group, wherein the isocyanate group-containing hydrophobic compound obtained in the first process step is reacted with one or more polysaccharide, and purifying the reaction product from the second process step using a solvent based on a ketone.

(20) The high purity product of a polysaccharide containing a hydrophobic group as defined in the above (19), wherein the polysaccharide is selected from the group consisting of pullulan, amylopectin, amyliose, dextran, hydroxyethyl cellulose, hydroxyethyl dextran, mannan, levan, inulin, chitin, chitosan, xyloglucan and water-soluble cellulose.

(21) The high purity product of a polysaccharide containing a hydrophobic group as defined in the above (19) or (20), wherein $R^2$ in the formula (1) is steryl.

(22) The high purity product of a polysaccharide containing a hydrophobic group as defined in any one of the above (19) to (21), wherein the content of unsubstituted polysaccharide is as low as 20% by weight or less.

(23) The high purity product of polysaccharide containing a hydrophobic group as defined in any one of the above (19) to (22), wherein the content of the impurity product, in which both the two NCO groups in the diisocyanate are reacted with the hydroxyl group-containing hydrocarbon having 12–50 carbon atoms or with the sterol, is as low as 0.05% by weight or less.

(24) The high purity product of a polysaccharide containing a hydrophobic group as defined in any one of the above (19) to (23), wherein the product purified using the solvent based on a ketone is subjected to a further purification by dispersing the product finely in water under an ultrasonic treatment, with subsequent ultracentrifugal separation.

(25) The high purity product of a polysaccharide containing a hydrophobic group as defined in any one of the above (19) to (23), obtained by subjecting the product purified using the solvent based on a ketone to a further purification procedures comprising dissolving the product in an aprotic polar solvent, admixing water with the resulting solution to cause the unsubstituted polysaccharide to be transferred to the aqueous phase and removing the aqueous phase separated by phase separation.

BRIEF DESCRIPTION OF THE DRAWINGS

FIG. 2(a) shows the result of analysis by a size exclusion chromatography (SEC) of a sample of the pullulan-cholesterol derivative (CHP) obtained in Example 1-2 before the ultrasonic treatment and FIG. 2(b) shows the result of SEC analysis of a sample collected after 30 minutes from the ultrasonic treatment. FIG. 2(c) shows the result of SEC analysis of the supernatant of an ultracentrifugation and FIG. 2(d) shows the result of SEC analysis of the solution resulting from an ultrasonic treatment of the aqueous phase of the bottom layer of the ultracentrifugation which has been re-swollen with water. In these Figures, the ordinate represents the strength (dimensionless) of the differential refractometer reading (the same applies in the following).

THE BEST MODE FOR EMBODYING THE INVENTION

Figure 1:
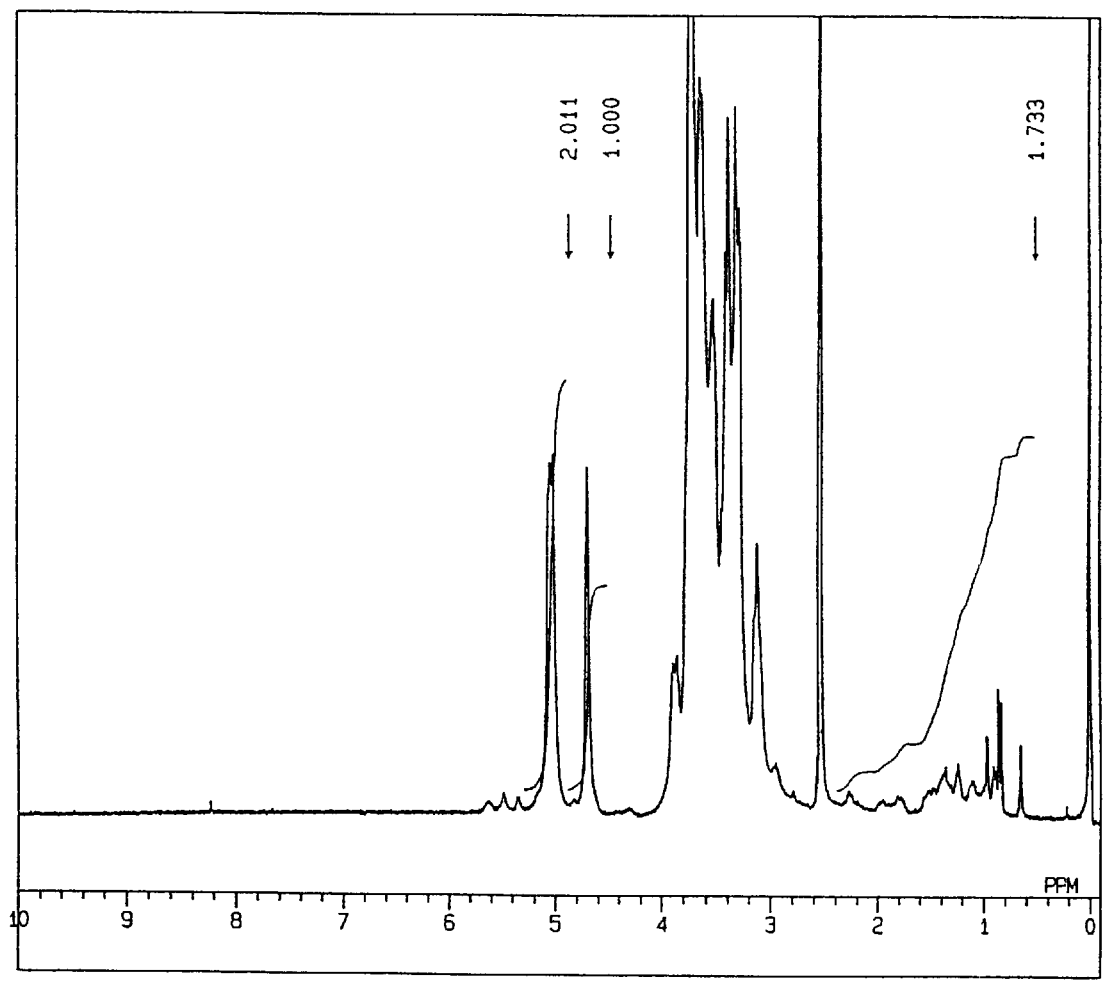
FIG. 1 shows a $^1$H-NMR spectrum of the pullulan-cholesterol derivative (CHP) obtained in Example 1-2.

In the context of this specification, it is meant by "high purity" that the content of a dimer resulting from the reaction of the hydrophobic group, such as the hydrocarbon group or the steryl group, with the diisocyanate compound and the unsubstituted polysaccharide is low.

The hydroxyl group-containing hydrocarbon having 12–50 carbon atoms to be incorporated according to the present invention is used as the raw material for the introduction of the hydrophobic group. As the hydroxyl group-containing hydrocarbon group having 12–50 carbon atoms to be incorporated according to the present invention, there may be exemplified those originated from alcohols, such as lauryl alcohol, myristyl alcohol, cetyl alcohol, stearyl alcohol, arachinyl alcohol, docosanol, pentacosanol, hexacosanol and octacosanol. Among them, preference is given to alcohols having 12–35 carbon atoms, especially having 12–20 carbon atoms, due to their easy availability. The hydroxyl group-containing hydrocarbon group having 12–50 carbon atoms may be employed either alone or in a combination of two or more of them. When a hydroxyl group-containing hydrocarbon group having less than 12 carbon atoms is employed as the raw material for the introduction of the hydrophobic group, the coagulating effect by hydrophobicity becomes unfavorably difficult to be revealed sufficiently. In contrast, if the number of carbon atoms exceeds over 50, such a product is difficultly available and unfavorable.

The sterol to be incorporated according to the present invention is used as the raw material for the introduction of the hydrophobic group. As the sterol to be employed according to the present invention, there may be enumerated, for example, cholesterol, stigmasterol, β-sitosterol, lanosterol and ergosterol. Among them, preference is given to cholesterol for its availability and so on. Sterols may be employed either alone or in a combination of two or more of them. It is permissible to use the sterol together with the hydroxyl group-containing hydrocarbon group having 12–50 carbon atoms.

The diisocyanate compound to be incorporated according to the present invention is that represented by the formula OCN—$R^1$—NCO (in which $R^1$ denotes a hydrocarbyl having 1–50 carbon atoms). Such a number of carbon atoms as exceeding over 50 is undesirable, since such a diisocyanate is difficultly obtainable. Specific examples of the diisocyanate compound include ethylene diisocyanate, namely, with $R^1$ of ethylene, butylene diisocyanate, with $R^1$ of butylene, hexamethylene diisocyanate, with $R^1$ of hexamethylene, and diphenyl-methane diisocyanate, with $R^1$ of diphenylmethane.

For the polysaccharide to be incorporated according to the present invention, those of natural occurrence and semisynthetic origin may be employed. Specifically, there may be exemplified one or more selected from the group consisting of pullulan, amylopectin, amylose, dextran, hydroxyethyl cellulose, hydroxyethyl dextran, mannan, levan, inulin, chitin, chitosan, xyloglucan and water-soluble cellulose. Among them, pullulan, mannan, xyloglucan, amylopectin, dextran and hydroxyethyl cellulose are preferred. Also, those nitrogen-containing polysaccharides, such as chitin, partially deacetylated chitin and chitosan, are favorable. The polysaccharides may be employed either alone or in a combination of two or more of them.

The hydrophobic group-containing polysaccharides produced by the process according to the present invention are those, in which 0.1 to 10, preferably 0.1 to 6 —XH groups, per 100 monosaccharide units constituting the polysaccharide having one or more groups represented by —XH (in which X is an oxygen atom or a nitrogen-containing group represented by NY with Y being a hydrogen atom or a hydrocarbyl of 1–10 carbon atoms) are replaced by the hydrophobic group represented by the formula (1) given above.

In the formula (1), $R^1$ denotes a group originated from the diisocyanate compound mentioned above. $R^2$ represents a hydroxyl group-containing hydrocarbon group having 12–50 carbon atoms and/or a group originated from sterol. Specific examples of the group represented by $R^2$ include laulyl, myristyl, cetyl, stearyl, cholesteryl, stigmasteryl, β-sito-steryl, lanosteryl and ergosteryl. More preferably, myristyl, stearyl and cholesteryl are enumerated.

In the production process according to the present invention, the hydroxyl group in the $CH_2OH$ group and the hydroxyl group bound directly to the monosaccharide are both subject to the replacement with the hydrophobic group represented by the formula (1), when a polysaccharide in which the constituent monosaccharides have $CH_2OH$ group bound thereto, such as pullulan, mannan or so on, is employed, wherein the proportion of the group subjected to such replacement is far greater for the hydroxyl group in the $CH_2OH$ group than the hydroxyl group bound directly to the monosaccharide.

In case a polysaccharide having $CH_2OH$ groups and $NH_2$ groups bound thereto, such as chitosan or the like, is employed, the OH group in $CH_2OH$, $NH_2$ group and the OH group bound directly to the monosaccharide are all subject to the replacement with the hydrophobic group represented by the formula (1), wherein the proportion of the group subjected to such replacement is far greater for the OH group in $CH_2OH$ and for the $NH_2$ group than for the OH group bound directly to the monosaccharide.

The production process according to the present invention comprises either the process steps 1 to 3 or the process steps 1 to 4 as given below. While the description of the production process in the following is directed to the case of using pullulan as the polysaccharide and a steryl group as the hydrophobic group, the production can be realized in a similar way also with other ones. The reactions included in the production process according to the present invention are given by the reaction schemes (I) and (II), wherein the reaction scheme (I) corresponds to the process step 1 and the reaction scheme (II) to the step 2.

Reaction Scheme (I)

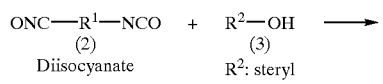
Diisocyanate    $R^2$: steryl

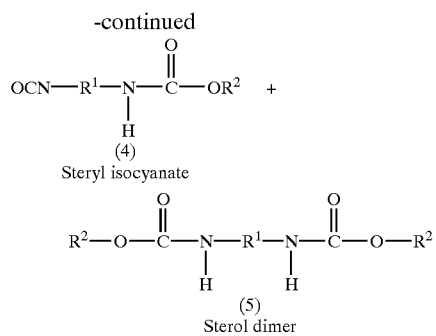

Reaction Scheme (II)

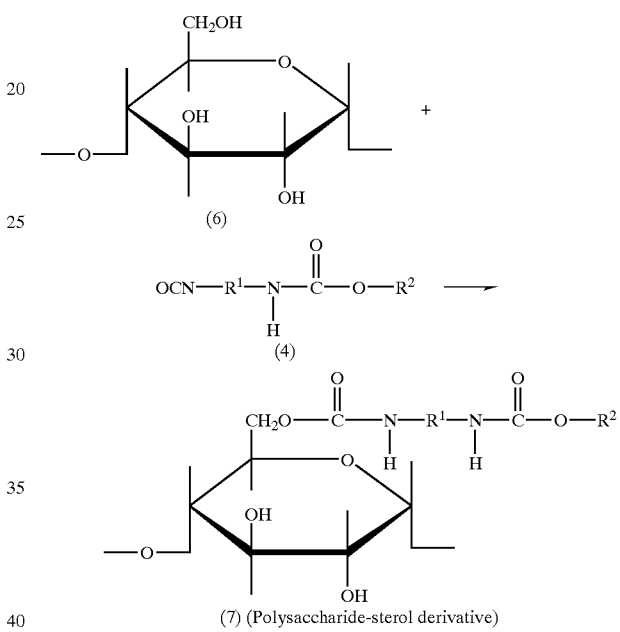

Process Step 1

As shown in the reaction scheme (I), the steryl isocyanate to be employed according to the present invention is a compound represented by the formula (4) having the steryl group at one end of an alkane and an isocyanate group at the other end thereof and can be obtained by the reaction of a diisocyanate compound represented by the formula (2) and a sterol expressed by the formula (3). On producing the compound represented by the formula (4), one isocyanato group of the diisocyanate compound represented by the formula (2) is reacted with the hydroxyl group of the sterol expressed by the formula (3) to produce the steryl isocyanate of the formula (4) in which the sterol is bound via urethane bond at one end and the isocyanate group at the other end remains unreacted as such. In this reaction, a sterol dimer represented by the formula (5) is by-produced usually at a proportion of about 10% by weight.

Process Step 2

As shown in the reaction scheme (II), the steryl isocyanate represented by the formula (4) obtained in the process step 1 given above is reacted with a polysaccharide (pullulan) represented by the formula (6) to produce the polysaccharide-sterol derivative (hydrophobic group-containing polysaccharide) represented by the formula (7). This reaction is addition of the hydroxyl group of the polysaccharide represented by the formula (6) and the isocyanato group of the steryl isocyanate represented by the formula (4) in an organic solvent in the presence of a basic catalyst.

Process Step 3

The reaction product obtained by the above process step 2 is purified by reprecipitation thereof using a solvent based on a ketone (in the following, this purification is called "ketone-purification"). By the ketone-purification, principally the sterol dimer by-produced in the process step 1 is removed, whereby a high purity product of polysaccharide-sterol derivative (the hydrophobic group-containing polysaccharide) can be obtained. In the specification of the present invention, the product resulting from the ketone-purification is expressed as "ketone-purified product". The ketone-purified product can also be subjected to a further purification by dialysis, in order to remove the reaction solvent.

Process Step 4

1) The ketone-purified product contained in the above process step 3 (including the purified product resulting from the dialysis) is subjected to a further purification by an ultracentrifugation. By the purification by ultracentrifugation, predominantly the unsubstituted polysaccharide (unreacted polysaccharide) is removed, whereby a more highly purified product of the hydrophobic group-containing polysaccharide can be obtained.

2) In the production process according to the present invention, the above purification procedure 1) by means of an ultracentrifugation can be replaced by a purification procedure using an aprotic polar solvent. The purification technique using the aprotic polar solvent consists in the procedures comprising dissolving the ketone-purified product (inclusive of the product purified by the dialysis) obtained by the above process step 3 in an aprotic polar solvent added thereto, introducing water to the resulting solution with sufficient agitation by, such as stirrer, and removing the aqueous layer formed by the phase separation. By the purification using the aprotic polar solvent, the unsubstituted polysaccharide (unreacted polysaccharide) is removed predominantly, whereby a still more highly purified hydrophobic group-containing polysaccharide can be obtained. This procedure can be effected in any repeats and, by a few repeats, the purity of the hydrophobic group-containing polysaccharide is further improved. It is also possible to obtain the hydrophobic group-containing polysaccharide in a solid pulverous form by removing the aprotic polar solvent.

Below, the process steps according to the present invention will further be described in more detail.

The step of producing the compound represented by the formula (4) in the process step 1 consists in the reaction of the diisocyanate compound represented by the formula (2) with the sterol represented by the formula (3) in an organic solvent in the presence of a basic catalyst. The amount of the diisocyanate compound to be used may favorably be 1–30 molar equivalents, preferably 10–20 molar equivalents, per one mole of the sterol. As the basic catalyst, use of amines is favorable, whereby the reaction proceeds efficiently.

As the organic solvent to be employed in the reaction, there may be enumerated, for example, solvents based on an ether, aprotic polar solvents, solvents based on a halogen compound and solvents based on aliphatic hydrocarbon and based on an aromatic hydrocarbon. As the solvent based on an ether, there may be exemplified apliphatic ethers, such as ethyl ether and so on, and heterocyclic ethers, such as tetrahydrofuran and the like. As the aprotic polar solvent, there may be enumerated, for example, acetone, dimethylformamide (DMF) and dimethyl sulfoxide (DMSO). As the solvent based on a halogen compound, there may be exemplified methylene chloride and chloroform. As the aliphatic hydrocarbon solvent, pentane, hexane and so on are exemplified. As the aromatic hydrocarbon solvent, benzene, toluene and so on are enumerated. Among them, aromatic hydrocarbons are preferred.

As the amine to be employed in the reaction of the reaction scheme (I), triethylamine, pyridine and so on may be exemplified. The amount of the amine to be used may range from 1 to 20 molar equivalents, preferably from 1 to 3 molar equivalents, per one mole of the sterol. The temperature and the duration of the reaction may differ in accordance with, for example, the diisocyanate compound and the solvent used, and may be settled with respect to the condition of progress of the reaction, while the reaction temperature may range preferably from room temperature to 100° C. and the reaction duration may preferably be in the range of 3–24 hours.

For the reaction, it is preferable to employ a dried solvent and a dried basic catalyst with preference to the condition under an inert gas atmosphere. As the inert gas, for example, nitrogen, argon and the like are enumerated.

The step of producing the compound represented by the formula (7) in the process step 2 consists in the reaction of the polysaccharide represented by the formula (6) with the steryl isocyanate compound represented by the formula (4) produced in the above process step 1 in an organic solvent in the presence of a basic catalyst. While the proportion of the charged amount of the polysaccharide and that of the steryl isocyanate is determined here by the contemplated amount of the steryl group to be introduced into the polysaccharide, preference is given to a ratio in the range from 0.1 to 10 molar equivalent with respect to 100 monosaccharide units in the polysaccharide.

As the organic solvent to be used for the reaction, there may be enumerated, for example, solvents based on ethers, aprotic polar solvents, solvents based on halogen compounds and solvents based on aliphatic hydrocarbons and based on aromatic hydrocarbons. As the solvents based on ethers, there may be exemplified apliphatic ethers, such as ethyl ether and so on, and heterocyclic ethers, such as tetrahydrofuran and the like. As the aprotic polar solvent, there may be enumerated, for example, acetone, dimethylformamide (DMF) and dimethyl sulfoxide (DMSO). As the solvent based on halogen compounds, there may be exemplified methylene chloride and chloroform. As the aliphatic hydrocarbon solvent, pentane, hexane and so on are exemplified. As the aromatic hydrocarbon solvent, benzene, toluene and so on are enumerated. Among them, aprotic polar solvents are preferred.

As the basic catalyst to be employed in the reaction of the reaction scheme (II), amines are preferred and, for example, triethylamine, pyridine and so on may be enumerated. The amount of the amine to be used may range from 1 to 10 molar equivalents, preferably from 1 to 3 molar equivalents, per one mole of the polysaccharide. The temperature and the duration of the reaction may differ in accordance with, for example, the polysaccharide and the solvent used, and may be settled with respect to the condition of progress of the reaction, while the reaction temperature may range preferably from room temperature to 100° C. and the reaction duration may preferably be in the range from 30 minutes to 24 hours.

For the reaction, it is preferable to employ a dried solvent and a dried basic catalyst with preference to the condition under an inert gas atmosphere. As the inert gas, for example, nitrogen, argon and the like are enumerated.

As the solvent based on a ketone to be employed in the ketone-purification in the above process step 3, there may be enumerated at least one selected from the group consisting of acetone, methyl ethyl ketone, diethyl ketone, diisopropyl ketone and the like. The amount of the solvent based on ketone to be used may be 4–50 times, preferably 8–20 times, the weight of the reaction solution obtained in the above process step 2. When the reaction product obtained in the above process step 2 is added to a solvent based on a ketone, the polysaccharide-sterol derivative (the hydrophobic group-containing polysaccharide) will precipitate out and the sterol dimer by-produced in the process step 1 is dissolved in the solvent based on ketone, so that a high purity product of the polysaccharide-sterol derivative can be obtained by separating and collecting the precipitate. The precipitate can be dried by a technique, such as freeze-drying, vacuum drying or the like. By the ketone-purification, a higher rate of removal of the sterol dimer can be achieved as compared with the conventional technique, such as dialysis, reprecipitation using ethanol, column chromatography or so on, whereby a high purity product of the hydrophobic group-containing polysaccharide can be obtained in an easy manner.

The content of the hydrophobic group-containing polysaccharide in the ketone-purified product is as high as 80% by weight or more, preferably as high as 90% by weight or more. The content of the unsubstituted polysaccharide is as low as 20% by weight or less, preferably as low as 10% by weight or less. The content of the impurity resulting from the reaction of both the two NCO groups in the diisocyanate compound with the hydrophobic group amounts to as low as 0.05% by weight or less, preferably as low as 0.01% by weight or less.

In the purification technique by means of an ultracentrifugation in the above process step 4-1), the ketone-purified product from the process step 3 is subjected to an ultracentrifugation after an ultrasonic treatment of the product with addition of water thereto. Here, distilled water, deionized water and the like may be used. The amount of water to be added may be 51–100 times, preferably 30–60 times the weight of the ketone-purified product. The ultracentrifugation may preferably be carried out at an acceleration of 10,000–200,000 G, preferably 30,000–100,000 G for a period of time of 1–24 hours, preferably 3–15 hours. By an ultracentrifugation, a phase separation occurs wherein the polysaccharide-sterol derivative having greater molecular weight gathers in the lower layer and the unsubstituted polysaccharide having lower molecular weight moves to the upper layer, whereby the high purity product of the polysaccharide-sterol derivative can be obtained by collecting the lower layer.

The content of the hydrophobic group-containing polysaccharide in the purified product from the ultracentrifugation is as high as 98% by weight or more, preferably as high as 99.9% by weight or more. The content of the unsubstituted polysaccharide is as low as 2% by weight or less, preferably as low as 0.1% by weight or less. The content of the impurity resulting from the reaction of both two NCO-groups in the diisocyanate compounds with the hydrophobic group is as low as 0.05% by weight or less, preferably as low as 0.01% by weight or less. By the purification by ultracentrifugation, even a high purity product of 99.9% by weight or higher can easily be obtained.

As the aprotic polar solvent which can be employed in the purification of the process step 4-2) using the aprotic polar solvent, there may be enumerated one or more selected from the group consisting of, for example, N,N-dimethylformamide (DMF), N,N-dimethylacetamide (DMAc), 1,3-dimethyl-2-imidazolidinone (DMI), dimethyl sufoxide (DMSO) and so on. The amount of the aprotic polar solvent to be employed may be 3–50 times, preferably 5–15 times, the weight of the ketone-purified product obtained in the process step 3. If the amount is less than 3 times the weight, it is short for dissolving the ketone-purified product. When the amount exceeds 50 times the weight, no phase separation into two phases may occur upon the addition of water, remaining in a miscible state. The temperature for dissolving the ketone-purified product in the aprotic polar solvent may be in the range of 0–150° C., preferably from room temperature to 100° C. Use of a solvent other than the aprotic polar solvent is unfavorable, since the hydrophobic group-containing polysaccharide and the unsubstituted polysaccharide may not be dissolved therein.

As the water to be used in the above process step 4-2), distilled water, deionized water, pure water and so on may be enumerated. Here, the amount of water to be used may be at least 5 times, preferably 10–100 times the weight of the solution obtained by dissolving the ketone-purified product in the aprotic polar solvent. If the amount is less than 5 times the weight, no phase separation may occur and the mixture remains in a miscible state. When, in contrast, the amount of water exceeds 100 times the weight, no marked increase in the efficiency of removal of the unsubstituted polysaccharide can be expected. It is preferable to add a predetermined amount of water to the solution all at once with subsequent mechanical agitation by, for example, a stirrer. A manner of addition with simultaneous mechanical agitation is not preferred, since a phase separation into two phases is thereby counteracted by the formation of a miscible mixture. It is permissible to perform the phase separation procedure by means of letting the mixture stand or by means of a forced phase separation by, such as centrifugation.

When water is added to the solution of the ketone-purified product in the aprotic polar solvent and agitating the resulting mixture to cause occurrence of phase separation into two layers of an aqueous layer and an aprotic polar solvent layer, the unsubstituted polysaccharide will move into the aqueous layer and the objective hydrophobic group-containing polysaccharide remains dissolved in the aprotic polar solvent layer, so that the unsubstituted polysaccharide can be removed by separating off the aqueous layer. By removing the aprotic polar solvent from the solvent layer remaining after the removal of the aqueous layer, a high purity product of the hydrophobic group-containing polysaccharide can be obtained. For removing the aprotic polar solvent, there may be employed techniques, such as chromatography, freeze-drying and reprecipitation. In particular, in reprecipitation, use of a solvent based on ketone or based on alcohol as the anti-solvent is preferred, for example, acetone, methyl ethyl ketone, methanol, ethanol and so on. The amount of the anti-solvent may be 4–50 times, preferably 8–20 times, the weight of the solution to be subjected to the reprecipitation. The resulting precipitate can be dried by techniques, such as freeze-drying and vacuum drying.

The purification using an aprotic polar solvent can be performed more conveniently in a more efficient manner as compared with the purification technique by means of an ultracentrifugation of the above process step 4-1). By this, a more larger scale production of high purity product of the hydrophobic group-containing polysaccharide expected for use in a living body, such as for a medicament, becomes possible.

The content of the hydrophobic group-containing polysaccharide in the purified product resulting from the technique using an aprotic polar solvent may be as high as 98% by weight or higher, preferably as high as 99.9% by weight or higher. The content of the unsubstituted polysaccharide is as low as 2% by weight or less, preferably as low as 0.1% by weight or less. The content of the impurity resulting from the side reaction in which the two NCO groups in the diisocyanate compound have been reacted with the hydrophobic group may be at most 0.02% by weight, preferably at most 0.01% by weight. By the purification using an aprotic polar solvent, a high purity product of 99.9% by weight or higher can easily be obtained.

By the process according to the present invention as described above, it is made possible to remove the by-poduced sterol dimer, which remains in the final product and the complete removal of which has heretofore been quite difficult by prior techniques, in a convenient and efficient manner, whereby production of a high purity product of a hydrophobic group-containing polysaccharide can be realized.

The high purity polysaccharide containing hydrophobic group according to the present invention is that obtained by the process according to the present invention described above, which has the hydrophobic group represented by the formula (1) given above and has a purity as high as 80% or more, preferably as high as 90% or more. The high purity polysaccharide according to the present invention can form a finely dispersed colloid solution by its cohesive nature due to the hydrophobic group represented by the formula (1) and reveals thus an ability for building up polymer micelles of a core/shell type.

The high purity polysaccharide containing a hydrophobic group according to the present invention can be utilized as a coating material for coating a drug carrier having encapsulated therein a drug. It can be used as the coating material for coating a drug carrier, such as a liposome microcapsule, microsphere, O/W emulsion and erythrocyte ghost. The high purity polysaccharide containing a hydrophobic group can be used for such medical materials safely, since it has low content of by-products and the unsubstituted polysaccharide and is highly pure.

As described above, the process for producing the high purity polysaccharide containing a hydrophobic group according to the present invention permits the production of a high purity product of a polysaccharide: containing a hydrophobic group having a low content of impurities, such as an unsubstituted polysaccharide and sterol dimer, in an easy and efficient manner, since it includes a step of purification using a solvent based on a ketone. A more highly pure product of a polysaccharide containing a hydrophobic group can be produced by incorporating, in combination, a purification by an ultracentrifugation or a purification with an aprotic polar solvent.

The high purity polysaccharide according to the present invention has a high purity due to its production process as described above, so that it can be used as a medical material safely.

Below, the present invention will further be described more specifically by way of examples.

EXAMPLE 1-1

(Synthesis of N-(6-Isocyanatohexyl)cholesteryl carbamate

In an eggplant type flask of 1 liter capacity, there was charged 25 g (0.065 mole) of cholesterol and thereto was added 300 ml of toluene to dissolve it, whereto 17 ml (0.12 mole) of triethylamine was added. To this mixture was added 161 g (0.96 mole, 14.8 eq.) of hexamethylene diisocyanate dissolved in 300 ml of toluene and the resulting mixture was subjected to reaction at 80° C. under a nitrogen atmosphere for about 6 hours. After termination of the reaction, toluene and the excess of hexamethylene diisocyanate were removed under a reduced pressure. By allowing the resulting yellowish oily residue to stand at room temperature overnight, pale yellow crystals were formed. The crystals were taken out and introduced into about one liter of hexane and the mixture was shaken vigorously, whereupon the supernatant was removed by decantation. This washing procedure was repeated four times, whereupon the product was dried under a reduced pressure for three hours at room temperature, whereby a white solid product (crystals) was obtained. Yield: 18.25 grams (50.9%).

The results of analysis of this product by $^1$H-NMR and IR were as given below.

$^1$H-NMR: δ ppm, in CDCl$_3$, TMS 0.68–2.35 (m, 43H); 1.34–1.55 (m, 8H); 3.14–3.18 (m, 2H); 3.27–3.32 (t, J=6.6 Hz, 2H); 4.4–4.6 (m, 2H); 5.38 (m, 1H);

IR (KBr, cm$^{-1}$):3260, 2320, 1680, 1130.

From these data, it was confirmed that the product obtained is N-(6-isocyanatohexyl)cholesteryl carbamate represented by the following formula (4a):

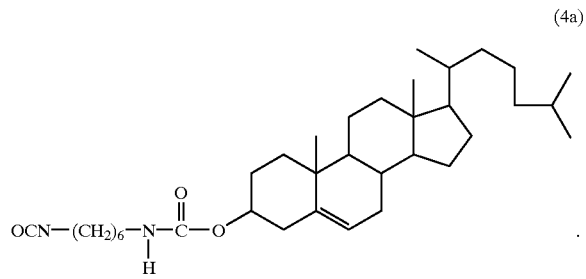

(4a)

On the other hand, the white crystals obtained were examined by a thin layer chromatography by developing it using Preparative TLC (supplied from Merck AG, Silika gel 60 F$_{254}$, developer: hexane/ethyl acetate=2/1), whereby existence of the by-produced cholesterol dimer (Rf=0.65) represented by the following formula (5a) was confirmed. The band for the cholesterol dimer on the TLC was subjected to extraction with acetone and the extract was analyzed, whereby it was confirmed that the cholesterol dimer was contained in the white crystalline product in an amount of 8% by weight.

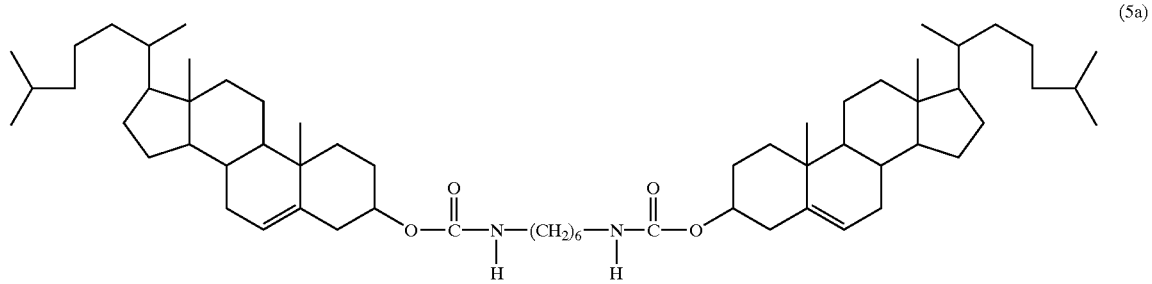

(5a)

EXAMPLE 1-2

(Synthesis of Pullulan-cholesterol Derivative (CHP))

In an eggplant type flask of 1 liter capacity, there was charged 40 g (248 mmol as anhydrous glucose unit) of pullulan (average molecular weight: 108,000) and 420 ml of dimethyl sulfoxide (sometimes abbreviated as DMSO) was added thereto and the mixture was agitated at 80° C. under a nitrogen atmosphere to dissolve it. To this mixture, a solution of 1.78 g (3.21 mmol) of N-(6-isocyanotohexyl) cholesteryl carbamate synthesized in EXAMPLE 1-1 dissolved in 31.6 g (0.40 mol) of pyridine was added and the mixture was subjected to reaction at 90° C. for 3 hours.

After termination of the reaction, dimethyl sulfoxide was distilled off and the resulting oily residue was dropped into 6 liters of acetone to form a precipitate to purify the product. After removal of the supernatant, 4 liters of acetone were added to the resulting precipitate and the mixture was allowed to stand overnight at room temperature. The precipitate was collected by filtration and was dried under a reduced pressure. The so-obtained solids were dissolved in dimethyl sulfoxide and the solution was charged in a dialysis bag (Spectra/Por3, a product of the firm Spectropor, an exclusion molecular weight of 3,500) and was subjected to a dialysis against distilled water for one week. 1.5 liters of the resulting polymer solution was treated by freeze-drying in an ordinary manner, whereby a white solid matter (in the following, denoted occasionally as "acetone-purified product") was obtained. Yield: 31.7 g (76.2%)

The results of analyses of this acetone-purified product by $^1$H-NMR and IR were as given below.

$^1$H-NMR: δ ppm, DMSO-$d_6$/$D_2O$=20/1, vol. 0.68–2.40; 2.60–4.60; 4.70–5.30;

IR (KBr, cm$^{-1}$): 1680, 1180–900.

From these data, it was confirmed that the product obtained is a pullulan/cholesterol derivative (abbreviated hereinafter sometimes as CHP) represented by the following formula (7a):

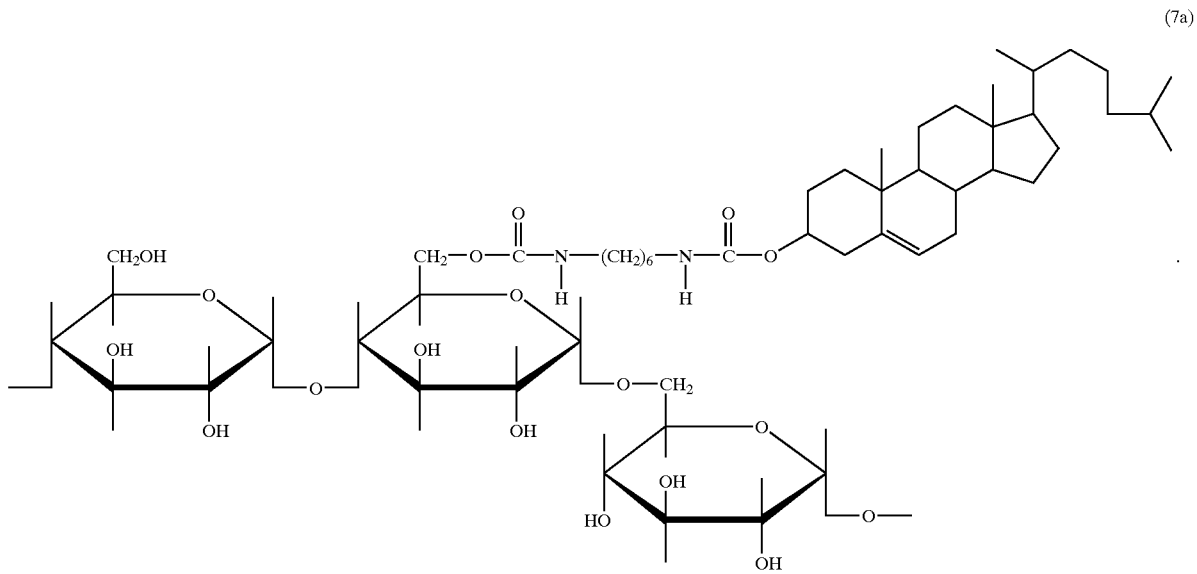

(7a)

On the other hand, the above product purified with acetone were analyzed by a thin layer chromatography using Preparative TLC {supplied from Merck AG, Silika gel 60 $F_{254}$, developer: hexane/ethyl acetate (2/1)}, whereby existence of the by-produced cholesterol dimer (Rf=0.65) represented by the formula (5a) was not recognized. Further, the acetone-purified product was analyzed by $^1$H-NMR and the content of the cholesterol dimer was calculated from the protone ratio. From the result, the existence of the, cholesterol dimer was not recognized. Therefore the content of the cholesterol dimer represented by the formula (5a) in the acetone-purified product was 0% by weight.

The acetone layer used for the purification was collected and the amount of cholesterol dimer contained therein was estimated. It was found that the amount of cholesterol dimer contained in the acetone layer was 0.140 gram. Since the amount of cholesterol dimer contained in the raw material of 1.78 grams (3.21 mmol) of N-(6-isocyanatohexyl) cholesteryl carbamate was calculated to be 0.142 gram (It had been confirmed that the content of cholesterol dimer in the product of EXAMPLE 1-1 was 8% by weight), the rate of removal of the cholesterol dimer was calculated from these data and the results is recited in Table 1.

The $^1$H-NMR spectrogram of the resulting target compound, i.e., pullulan-cholesterol derivative represented by the formula (7a), is given in FIG. 1. From the integration value of the peak area of this $^1$H-NMR spectrogram, the proportion of introduction of the cholesterol groups into pullulan of the pullulan-cholesterol derivative is calculated by the following calculation equation (A):

$(100+2x)/51x=b/a$            (A)

in which the symbols denote:
    a: the peak area of the cholesterol group ($\delta$=0.68–2.40)
    b: the peak area of pullulan ($\delta$=4.70–5.30)
    x: proportion of substitution with cholesterol group per 100 monosaccharide units.

From the calculation, it is found that the proportion of substitution with cholesterol groups in the pullulan-cholesterol derivative represented by the above formula (7a) is 1.1 groups per 100 monosaccharide units.

COMPARATIVE EXAMPLE 1

Test of Reprecipitation with Ethanol

A pullulan-cholesterol derivative was synthesized by the same procedures as in EXAMPLE 1-2. After termination of the reaction, the purification was performed by reprecipitation with ethanol, whereby a pullulan-cholesterol derivative was obtained.

The analysis of the product purified with ethanol was performed using Preparative TLC in the same manner as in EXAMPLE 1-2. From the result, existence of the cholesterol dimer (Rf=0.65) represented by the formula (5a) was confirmed. The content of the cholesterol dimer in the product purified with ethanol was calculated from $^1$H-NMR analysis as in EXAMPLE 1-2,. The result showed that the cholesterol dimer is contained in the product in an amount of 0.4% by weight.

The ethanol layer used for the purification was collected and the amount of the cholesterol dimer contained therein was estimated, which showed that the, content was 0.016 gram. From this, the rate of removal of the cholesterol dimer was calculated in the same, manner as in EXAMPLE 1-2. The result is recited in Table 1.

TABLE 1

|  | EXAMPLE 1-2 | COMP. EXAMPLE 1 |
|---|---|---|
| Solvent for reprecipitation | Acetone | Ethanol |
| Colesterol dimer content (wt. %) | 0 | 0.4 |
| Cholesterol dimer removal wt. % | 98.6 | 11.3 |

From Table 1, it is confirmed that the cholesterol dimer can be removed almost completely by purifying the product by reprecipitation using acetone as the reprecipitation solvent.

EXAMPLE 1-3

Purification of Pullulan-cholesterol Derivative (CHP)

To 40 mg of the pullulan-cholesterol derivative synthesized in EXAMPLE 1-2, 20 ml of pure water were added and the mixture was subjected to an ultrasonic wave irradiation by a sonicator of a probe-type (TOMY, a unit supplied by the firm URP, with a probe outer diameter of 5 mm) for 30 minutes at 40 W. During the irradiation, the temperature of the aqueous mixture was maintained at 4° C. by cooling the vessel from outside with ice water.

Samples of each 10 ml of the ultrasonic wave-irradiated aqueous mixture were collected in centrifuge tubes and were subjected to a centrifugation at 55,000 G for 10 hours at 25° C. A phase separation was brought about, wherein the unsubstituted pullulan (unreacted pullulan) was gathered in the supernatant and the pullulan-cholesterol derivative (CHP) was separated in the lower layer.

The samples collected before and after the ultrasonic wave irradiation, respectively, were analyzed by SEC (size exclusion chromatography). The conditions in the SEC were as given below. The results are shown in FIGS. 2($a$) and 2($b$), respectively.

| Apparatus used | TOSOH HPSEC SYSTEM (trademark, of Tosoh K.K.) |
|---|---|
| Column | TSK-gel G4000SWXL (trademark, of Tosoh K.K.) |
| Eluent | 0.02% NaN$_3$ in deionized water |
| Flow rate | 0.5 ml/min. |
| Temperature | 35° C. |
| Detector | RI (differential refractometer) |

Calculated from the peak area of FIG. 2($b$), it is found that pullulan of which the molecular weight is lower (unreacted pullulan) is contained in the product purified with acetone in an amount of about 5% by weight. The supernatant of ultracentrifugation was subjected to an SEC analysis. The result is shown in FIG. 2($c$). The gelled mass (precipitate) in the lower layer of the centrifugation was caused to swell again with water and was then subjected to an ultrasonic wave treatment in the same manner as above, whereupon the so-ultrasonicated solution was examined by SEC analysis. The result is shown in FIG. 2($d$). From these results, it is confirmed that, in the supernatant of the ultracentrifugation, almost 100% by weight of the lower molecular weight pullulan (unreacted pullulan) as an impurity has been removed and that the precipitate has no content of the lower molecular weight pullulan.

From the above results, it was confirmed that the pullulan-cholesterol derivative (CHP) represented by the formula (7a) was obtained at a high purity. The results are summarized in Table 2.

TABLE 2

| Content of CHP in acetone-purified product (wt. %) | 95 |
|---|---|
| Content of CHP in ultracentrifug.-purified product (wt. %) | 100 |
| Content of unsubstituted pullulan (wt. %) | 0 |
| Content of cholesterol dimer (wt. %) | 0 |

EXAMPLE 2-1

Synthesis 1 of Mannan-cholesterol Derivative CHM)

By following the same procedures for the reaction as in EXAMPLE 1-2, a commercial product of mannan (a product of the firm Sigma) and N-(6-so-cyanatohexyl)cholesteryl carbamate were brought into reaction. The charged amount of each starting material was as given below:

1) Mannan (Mw=85,000): 26.2 g (162 mmol as anhydrous mannose unit)
2) N-(6-isocyanatohexyl)cholesteryl carbamate: 1.08 g (1.95 mmol)
3) Pyridine: 19.2 g (243 mmol)
4) Dimethyl sulfoxide: 320 ml After termination of the reaction, purification was performed by reprecipitation with acetone solvent. Then, the product was subjected to a dialysis, followed by a freeze-drying, whereby 21.5 grams (yield=79.5%) of a white solid matter was obtained.

The results of analyses of the above acetone-purified product by $^1$H-NMR and IR are given below:

$^1$H-NMR: δ ppm, DMSO-$d_6$/$D_2O$=20/1, vol. 0.68–2.40; 2.60–4.60; 4.60–5.40;

IR (KBr, cm$^{-1}$): 1680, 1180–900.

From these data, it was confirmed that the product obtained is a mannan/cholesterol derivative (CHM) represented by the following formula (7b):

Then, the acetone-purified product obtained as above was further purified by an ultracentrifugation in the same manner as in EXAMPLE 1-3 to remove the lower molecular weight mannan (unsubstituted mannan). The results are given in Table 3.

TABLE 3

| | |
|---|---|
| Content of CHM in acetone-purified product (wt. %) | 90 |
| Content of CHM in ultracentrifug.-purified product (wt. %) | 100 |
| Content of unsubstituted mannan (wt. %) | 0 |
| Content of cholesterol dimer (wt. %) | 0 |

EXAMPLE 2-2

Synthesis 2 of Mannan-cholesterol Derivative (CHM)

By following the same procedures for the reaction as in EXAMPLE 1-2, a commercial product of mannan (a product of the firm Sigma) and N-(6-isocyanatohexyl)cholesteryl

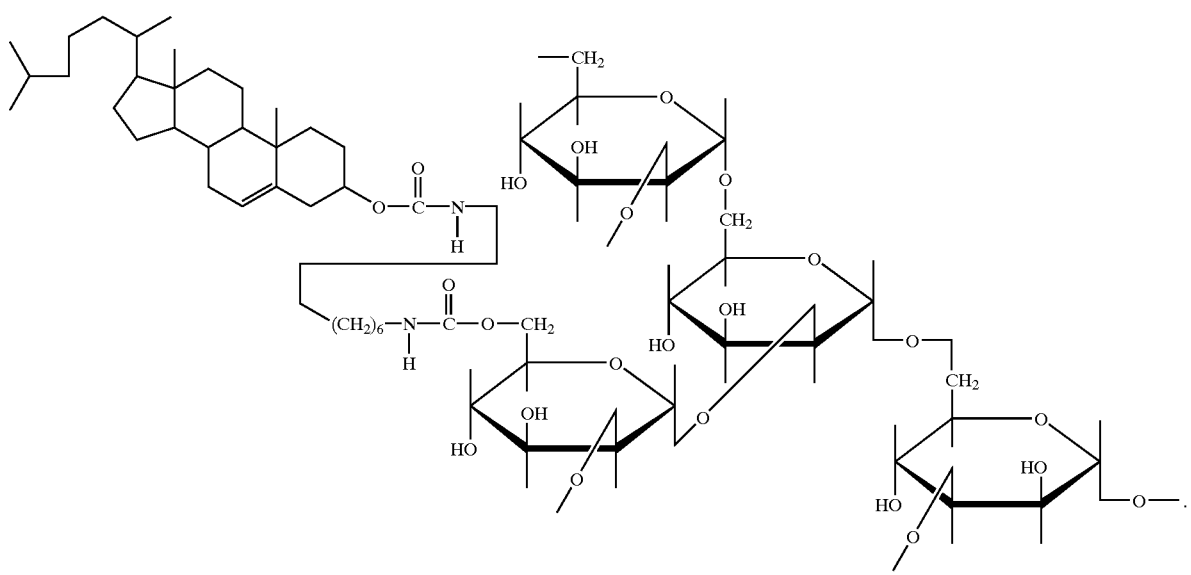

(7b)

On the other hand, the above product purified with acetone was analyzed using Preparative TLC in the same manner as in EXAMPLE 1-2, whereby existence of the cholesterol dimer (Rf=0.65) represented by the formula (5a) was not recognized. Further, the acetone-purified product was analyzed by $^1$H-NMR and the content of the cholesterol dimer was calculated from the proton ratio. From the result, existence of the cholesterol dimer was not recognized. Therefore the content of the cholesterol dimer represented by the formula (5a) in the acetone-purified product is 0% by weight.

Figure 3:
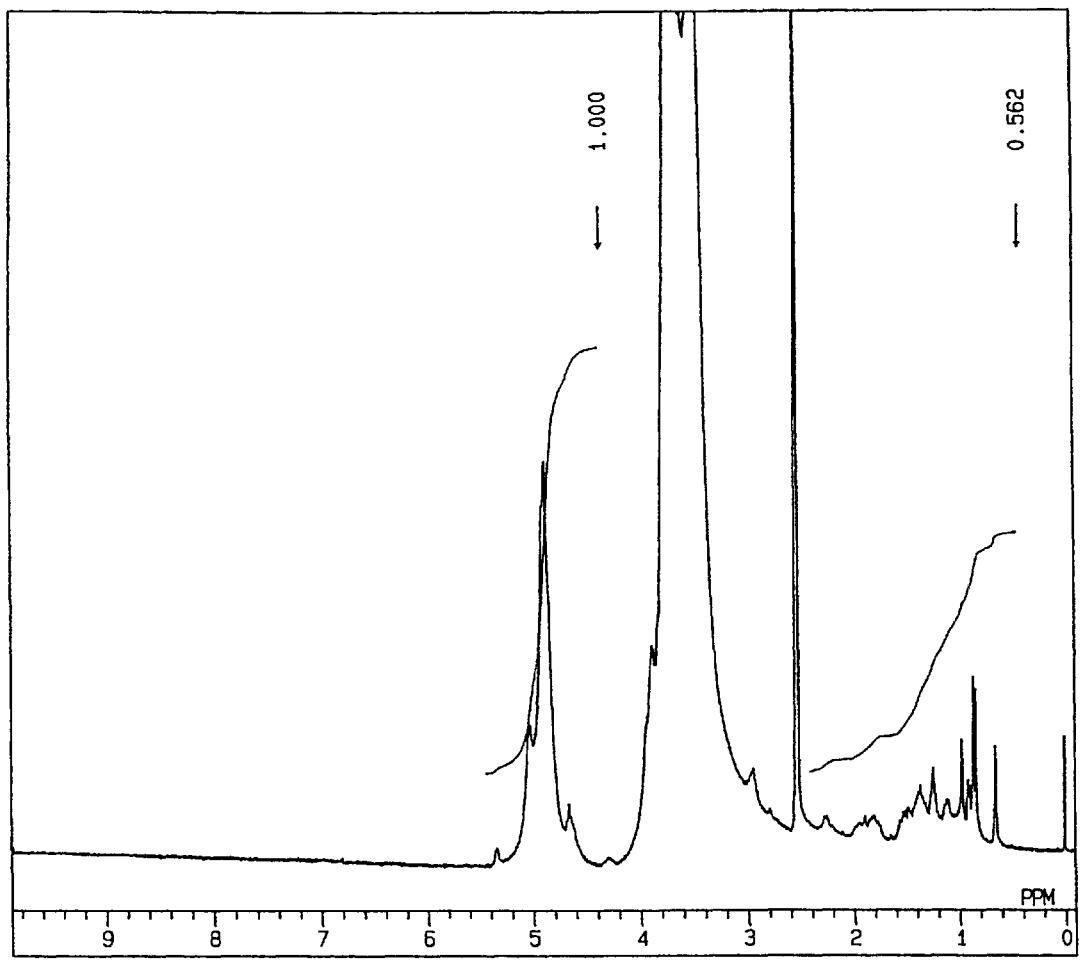
FIG. 3 shows a $^1$H-NMR spectrum of the mannan-cholesterol derivative (CHM) obtained in Example 2-1.

$^1$H-NMR spectrogram of the compound represented by the above formula (7b) obtained in the manner described above is shown in FIG. 3. The proportion of introduction of the cholesteryl group into mannan in the mannan-cholesterol derivative is calculated in the same way as in EXAMPLE 1-2. From the result, it is found that the proportion of substitution with cholesteryl group is 1.1 groups per 100 monosaccharide units.

carbamate were brought into reaction. The charged amount of each starting material was as given below:

1) Mannan (Mw=85,000): 5 g (31 mmol as anhydrous mannose unit)
2) N-(6-isocyanatohexyl)cholesteryl carbamate: 138 mg (0.25 mmol)
3) Pyridine: 3.7 g (47 mmol)
4) Dimethyl sulfoxide: 75 ml After termination of the reaction, purification was performed by reprecipitation with acetone solvent. Then, the product was subjected to a dialysis, followed by a freeze-drying, whereby 4.05 grams (yield=78.8%) of a white solid matter was obtained.

The results of analyses of the above acetone-purified product by $^1$H-NMR and IR are given below:

$^1$H-NMR: δ ppm, DMSO-d$_6$/D$_2$O=20/1, vol. 0.68–2.40; 2.60–4.60; 4.60–5.40;

IR (KBr, cm$^{-1}$): 1680, 1180–900.

From these data, it was confirmed that the product obtained is a mannan/cholesterol derivative (CHM) represented by the above formula (7b):

On the other hand, the above product purified with acetone was analyzed using Preparative TLC in the same manner as in EXAMPLE 1-2, whereby existence of the cholesterol dimer (Rf=0.65) represented by the formula (5a) was not recognized. Further, the acetone-purified product was analyzed by $^1$H-NMR and the content of the cholesterol dimer was calculated from the proton ratio. From the result, existence of the cholesterol dimer was not recognized. Therefore the content of the cholesterol dimer represented by the formula (5a) in the acetone-purified product is 0% by weight.

Figure 4:
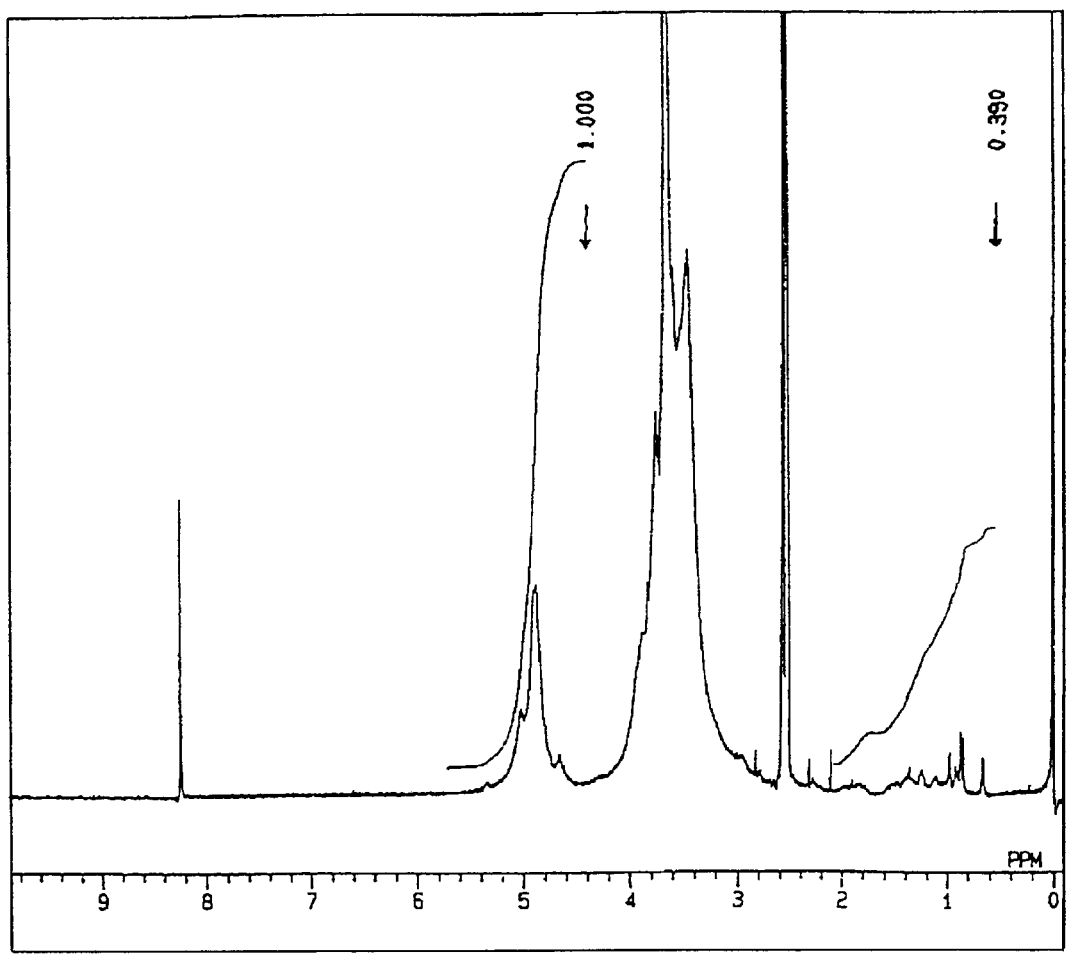
FIG. 4 shows a $^1$H-NMR spectrum of the mannan-cholesterol derivative (CHM) obtained in Example 2-2.

$^1$H-NMR spectrogram of the mannan-cholesterol derivative (CHM) obtained in the manner described above is shown in FIG. 4. The proportion of introduction of the cholesteryl group into mannan in this compound is calculated in the same way as in EXAMPLE 1-2. From the result, it is found that the proportion of substitution with cholesteryl group is 0.8 group per 100 monosaccharide units.

Then, the acetone-purified product obtained as above was further purified by an ultracentrifugation in the same manner as in EXAMPLE 1-3 to remove the lower molecular weight mannan (unsubstituted mannan). The results are given in Table 4.

TABLE 4

| | |
|---|---|
| Content of CHM in acetone-purified product (wt. %) | 87 |
| Content of CHM in ultracentrifug.-purified product (wt. %) | 100 |
| Content of unsubstituted mannan (wt. %) | 0 |
| Content of cholesterol dimer (wt. %) | 0 |

EXAMPLES 3 TO 6

Production of High Purity Polysaccharide Containing Steryl Group

Using a polysaccharide of natural origin, namely, xyloglucan (EXAMPLE 3), amylose (EXAMPLE 4), dextran (EXAMPLE 5) and a synthetic polysaccharide, i.e. hydroxyethyl cellulose (EXAMPLE 6), a high purity polysaccharide-cholesterol derivative was obtained by similar procedures for reaction as those in EXAMPLES 1-2 and 1-3.

The proportion of introduction of cholesteryl group, the rate of removal of the cholesterol dimer (weight %) and the content thereof (weight %) were estimated in accordance with corresponding analytical techniques. The content of the unsubstituted polysaccharide was also determined before and after the ultracentrifugation. The results are summarized in Table 5.

TABLE 5

| | Example | | | |
|---|---|---|---|---|
| | 3 | 4 | 5 | 6 |
| Starting polysaccharide | Xyloglucan | Amylose | Dextran | Hydroxyet. cellulose |
| Number of cholesteryl groups in the product[1] | 1.2 | 0.8 | 1.3 | 1.0 |
| Purity of the acetone purified product (wt. %) | 90 | 82 | 88 | 92 |
| Purity of ultracentr.-purified product (wt. %) | 100 | 100 | 100 | 100 |
| Impurity | | | | |
| Content of cholesterol dimer (wt. %) | 0 | 0 | 0 | 0 |
| Rate of removal of cholesterol dimer (wt. %) | 98.4 | 98.8 | 98.6 | 98.4 |
| Content of unreacted polysaccharide (wt. %) | | | | |
| before ultracentrifugation | 10 | 18 | 12 | 8 |
| after ultracentrifugation | 0 | 0 | 0 | 0 |

Note:
[1] Number of cholesteryl groups introduced per 100 monosaccharide units in the product.

From Table 5, it is seen that cholesteryl groups can be introduced in a similar way into other Polysaccharides than pullulan and mannan.

EXAMPLE 7-1

Synthesis of N-(6-Isocyanatohexyl)stearyl carbamate (Synthesis of Stearylpullulan)

In an eggplant type flask of 1 liter capacity, there was charged 3.48 g (12.9 mmol) of stearyl alcohol and thereto were added 50 ml of toluene to dissolve it, whereto 2.04 g (25.8 mmol) of pyridine was further added. To this mixture, there was added 30 g (178 mmol, 14.8 eq.) of hexamethylene diisocyanate dissolved in 50 ml of toluene and the resulting mixture was subjected to reaction at 80° C. under a nitrogen atmosphere for about 3 hours. After termination of the reaction, toluene and the excess of hexamethylene diisocyanate were removed under a reduced pressure, whereby pale yellow crystals were formed. The crystals were taken out and introduced into about one liter of hexane and the mixture was shaken vigorously. whereupon the supernatant was removed by decantation. This washing procedure was repeated four times, whereupon the product was dried under a reduced pressure for three hours at room temperature, whereby. 2.75 g of a white solid product (crystals) were obtained (yield: 48.7%).

The result of analysis of this product by $^1$H-NMR was as given below.

$^1$H-NMR: δ ppm, in CDCl$_3$, TMS 0.88 (t, d=6.8 Hz, 3H); 1.10–1.65 (m, 40H); 3.14–3.18 (m, 2H); 3.29 (t, J=6.6 Hz, 2H); 4.01–4.06 (m, 2H); 4.61 (m, 1H).

From these data, it was confirmed that the product obtained is N-(6-isocyanatohexyl)stearyl carbamate represented by the following formula (8):

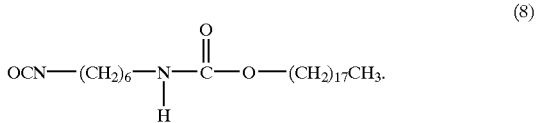

(8)

On the other hand, the above product purified with acetone were analyzed using Preparative TLC in the same manner as in EXAMPLE 1-1, whereby existence of a stearyl dimer (Rf=0.68) represented by the following formula (9) was recognized. Further, the band for the stearyl dimer on the TLC was extracted with acetone and analysed quantitatively, whereby it was confirmed that the stearyl dimer was present in the white crystals in an amount of 3% by weight.

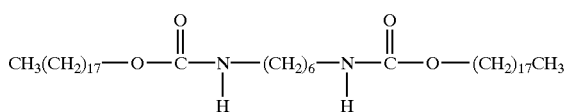

(9)

EXAMPLE 7-2

Synthesis of Stearyl-pullulan Derivative (STP)

In an eggplant type flask of 100 ml capacity, there was charged 2.0 g (12.3 mmol as anhydrous glucose unit) of pullulan (Mw=108,000) and thereto was added 30 ml of dimethyl sulfoxide and the resulting mixture was agitated at 80° C. under a nitrogen atmosphere to dissolve it. To this mixture, a solution of 70 mg (0.148 mmol) of N-(6-isocyanatohexyl)stearyl carbamate synthesized in EXAMPLE 7-1 dissolved in 1.47 g (14.6 mmol, 1.2 eq.) of pyridine was added and the mixture was subjected to reaction at 90° C. for 2 hours.

After termination of the reaction, dimethyl sulfoxide was distilled off under a reduced pressure and the resulting oily residue was dropped into 300 ml of acetone to form a precipitate to purify the product. After removal of the supernatant, 200 ml of acetone were added to the resulting precipitate and the mixture was allowed to stand overnight at room temperature. The precipitate was collected by filtration and dried under a reduced pressure. The so-obtained solids were dissolved in dimethyl sulfoxide and the solution was charged in a dialysis bag (Spectra/Por3, a product of the firm Spectropor, an exclusion molecular weight of 3,500) and was subjected to a dialysis against distilled water for one week. 150 ml of the resulting polymer solution were treated by freeze-drying in an ordinary manner, whereby 1.60 g of a white solid matter (in the following, denoted occasionally as "acetone-purified product") was obtained (yield 79.2%).

The results of analyses of this acetone-purified product by $^1$H-NMR and IR were as given below.

$^1$H-NMR: δ ppm, DMSO-d$_6$/D$_2$O=20/1 (vol.); 0.86–1.70; 2.60–4.60; 4.60–5.30;

IR (KBr, cm$^{-1}$): 1680, 1180–900

From these data, it was confirmed that the product obtained is a stearyl-pullulan derivative (abbreviated hereinafter sometimes as STP) represented by the following formula (10):

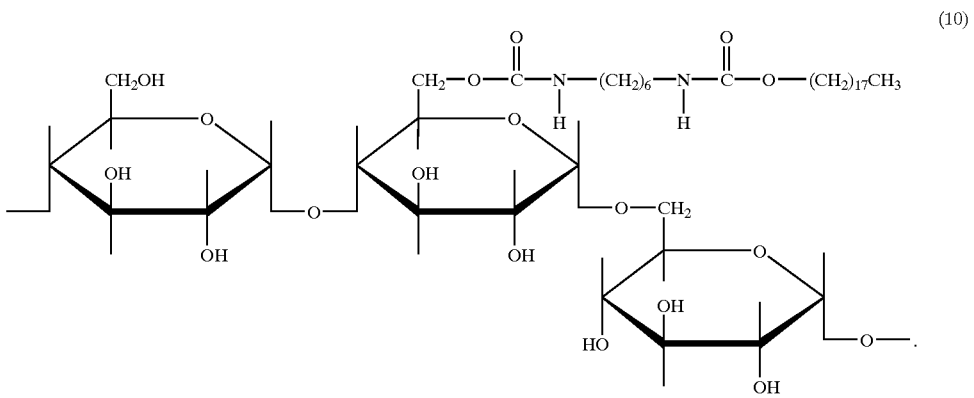

(10)

On the other hand, the above product purified with acetone were analyzed using Preparative TLC in the same manner as in EXAMPLE 1-2, whereby existence of the stearyl dimer represented by the formula (9) was not recognized. Further, the acetone-purified product was analyzed by $^1$H-NMR and the content of the stearyl dimer was calculated from the proton ratio. From the result, existence of the stearyl dimer was not recognized. Therefore the content of the stearyl dimer represented by the formula (9) in the acetone-purified product is 0% by weight.

From the integration value of the peak area of the $^1$H-NMR spectrogram, the proportion of introduction of the stearyl groups into pullulan is calculated by the following calculation equation (B):

$$(100+2x)/43x=b/a \qquad (B)$$

in which the symbols denote:
- a: the peak area of the stearyl group (δ=0.86–1.70)
- b: the peak area of pullulan (δ=4.60–5.30)
- x: proportion of substitution with stearyl group per 100 monosaccharide units.

From the calculation, it is found that the proportion of substitution with stearyl group in the stearyl-pullulan derivative is 0.8 group per 100 monosaccharide units.

The acetone-purified product obtained as above was further purified by an ultracentrifugation as in EXAMPLE 1-3 to remove the lower molecular weight pullulan (unsubstituted pullulan). Results are given in Table 6.

TABLE 6

| | |
|---|---|
| Content of STP in acetone-purified product (wt. %) | 92 |
| Content of STP in ultracentrifug.-purified product (wt. %) | 100 |
| Content of unsubstituted pullulan (wt. %) | 0 |
| Content of stearyl dimer (wt. %) | 0 |

EXAMPLE 8-1

Purification with Aprotic Polar Solvent 10 grams of the pullulan-cholesterol derivative obtained in EXAMPLE 1-2 was dissolved in 70 grams of an aprotic polar solvent dimethyl sulfoxide (DMSO),. whereto was added 1,400 grams of water and the mixture was agitated using a magnetic stirrer for 10 minutes. After the agitation, the mixture was allowed to stand as such at room temperature for one hour. The supernatant was removed by decantation, whereupon the same amount, as extracted, of water was added to the residue and the resulting mixture was agitated for 10 minutes using a magnetic stirrer, followed by a pause of standing of one hour. This procedure was repeated twice to effect purification. Then, the lower layer was mixed with 1,000 grams of water, whereupon the mixture was subjected to freeze-drying over a period of two days. As the result, 7.5 grams of a white solid matter were obtained (yield =75%). The results are summarized in Tables 7 and 8.

Figure 5:
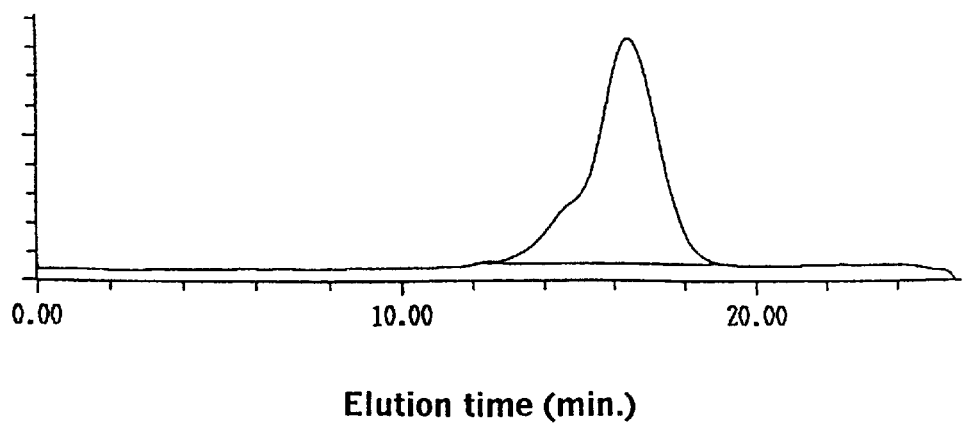
FIG. 5 shows the result of analysis by a size exclusion chromatography (SEC) of a sample of the pullulan-cholesterol derivative (CHP) obtained in Example 1-2 which is purified with a non-polar solvent followed by an ultrasonic treatment.

By adding water to the resulting white solid matter, a 0.2 wt. % aqueous solution was prepared, which was subjected to an ultrasonication using a sonicatore of the probe type (TOMY of the firm URP, with a probe outer diameter of 5 mm, at 40 W) for 15 minutes. A sample collected after the ultrasonication was examined by a size exclusion chromatography (SEC) under the conditions given below. The results are shown in FIG. 5. No peak was found in FIG. 5 and, thus, it is seen that a pullulan-cholesterol derivative of a high purity in which unsubstituted pullulan had been removed was obtained.

○ Conditions in the SEC analysis:

| | |
|---|---|
| Apparatus used | TOSOH HPSEC SYSTEM (trademark, of Tosoh K.K.) |
| Column | TSK-gel G4000SWXL (trademark, of Tosoh K.K.) |
| Eluent | 0.02% $NaN_3$ in deionized water |
| Flow rate | 0.5 ml/min. |
| Temperature | 35° C. |
| Detector | RI (differential refractometer) |

EXAMPLES 8-2 TO 8-6

Purification of each product was conducted using the hydrophobic group-containing polysaccharide and the aprotic polar solvent given in Tables 7 and 8 under the purification conditions given in Tables 7 and 6 by the same operation as in EXAMPLE 8-1. In all the purification operations, the procedure of phase separation into two layers was repeated twice. The results are summarized in Tables 7 and 8.

By SEC analysis of each of the hydrophobic group-containing polysaccharides, no peak for the unsubstituted polysaccharide was found in any of the EXAMPLES and, thus, it was confirmed that all the products of hydrophobic group-containing polysaccharide had been purified to nearly 100 weight % purity.

TABLE 7

Results of Acetone-Purified Product

| | Example | | | | | |
|---|---|---|---|---|---|---|
| | 8-1 | 8-2 | 8-3 | 8-4 | 8-5 | 8-6 |
| Starting polysaccharide | Pullulan | Pullulan | Pullulan | Pullulan | Mannan | Pullulan |
| Hydrophobic group | Cholester. | Cholester. | Cholester. | Cholester. | Cholester. | Stearyl |
| Introduct. proportion[1] of hydrophobic group | 1.1 | 1.3 | 2.9 | 1.1 | 1.9 | 0.8 |
| Product | CHP | CHP | CHP | CHP | CHM | STP |
| Content of unreacted polysaccharide (wt. %) | 5 | 10 | 16 | 5 | 20 | 16 |
| Content of dimer (wt. %) | 0 | 0 | 0 | 0 | 0 | 0 |
| Purity (wt. %) | 95 | 90 | 84 | 95 | 80 | 84 |

Note:
[1] Number of groups introduced per 100 monosaccharide units in the product.

TABLE 8

Purification with Aprotic Polar Solvent and the Results

| | Example | | | | | |
|---|---|---|---|---|---|---|
| | 8-1 | 8-2 | 8-3 | 8-4 | 8-5 | 8-6 |
| Amount of acetone-purified product (g) | 10 | 40 | 5 | 10 | 2 | 3 |
| Aprotic polar solvent | | | | | | |
| Kind[1] | DMSO | DMSO | DMSO | DMF | DMSO | DMAc |
| Amount used (g) | 70 | 320 | 50 | 70 | 12 | 18 |

TABLE 8-continued

Purification with Aprotic Polar Solvent and the Results
Example

| | 8-1 | 8-2 | 8-3 | 8-4 | 8-5 | 8-6 |
|---|---|---|---|---|---|---|
| Times weight | 7 | 8 | 10 | 7 | 6 | 6 |
| Amount of water used (g) | 1,400 | 5,000 | 800 | 1,000 | 150 | 300 |
| Treating procedures | Water wash Two layer-separation Two steps | Water wash Two layer-separation Two steps | Water wash Two layer-separation Two steps | Water wash Two layer-separation Two steps | Water wash Two layer-separation Two steps | Water wash Two layer-separation Two steps |
| Treating time (hr) | 5 | 5 | 4 | 5 | 4 | 4 |
| Yield (wt. %) | 75 | 75 | 80 | 72 | 65 | 69 |
| Purity (wt. %) | 100 | 100 | 100 | 100 | 100 | 100 |
| Content of unreacted polysaccharide (wt. %) | 0 | 0 | 0 | 0 | 0 | 0 |

Note:
[1]DMSO = dimethyl sulfoxide,
DMF = N,N-dimethylformamide,
DMAc = N,N-dimethylacetamide In the purification using an aprotic polar solvent, a though-put of purification of 10 grams in about 5 hours was able to be attained and the yield was also superior as it amounted to as high as 65% by weight or higher. The purification for each product was over within about 2 hours. There is no limitation in principle for the amount to be purified and mass purification can be realized easily. From these points of view, it is seen that the purification with an aprotic polar solvent is very effective for industrial mass production.

INDUSTRIAL APPLICABILITY

The product of a polysaccharide containing a hydrophobic group obtained by the production process according to the present invention can be utilized as a coating material for coating drug carriers containing drugs encapsulated therein. For example, the product can be used as the coating material for coating drug carriers, such as liposome microcapsules, microspheres, O/W emulsions and erythrocyte ghosts. In this case, the high purity polysaccharide containing a hydrophobic group according to the present invention can be used safely as medical material, since it is present as a high purity product having low content of by-products and of the unsubstituted polysaccharide.

What is claimed is:

1. A process for producing a high purity polysaccharide containing a hydrophobic group, comprising
   a first process step of producing an isocyanate group-containing hydrophobic compound, wherein one mole of a hydroxyl group-containing hydrocarbon having 12–50 carbon atoms or of a sterol is reacted with a diisocyanate represented by OCN—$R^1$—NCO, in which $R^1$ is a hydrocarbyl of 1–50 carbon atoms,
   a second process step of producing the polysaccharide containing a hydrophobic group composed of the hydrocarbon group of 12–50 carbon atoms or of the steryl group, wherein the isocyanate group-containing hydrophobic compound obtained in the first process step is reacted with one or more polysaccharides,
   and a third process step of purifying the reaction product in the second process step with a solvent based on a ketone.

2. The process as claimed in claim 1, wherein the polysaccharide is selected from the group consisting of pullulan, amylopectin, amylose, dextran, hydroxyethyl cellulose, hydroxyethyl dextran, mannan, levan, inulin, chitin, chitosan, xyloglucan and water-soluble cellulose.

3. The process as claimed in claim 1, wherein the solvent based on a ketone comprises one or more selected from the group consisting of acetone, methyl ethyl ketone, diethyl ketone and diisopropyl ketone.

4. The process as claimed in claim 1, wherein the hydrophobic group-containing polysaccharide has a group represented by —XH, in which X is an oxygen atom or a nitrogen-containing group represented by NY, with Y being a hydrogen atom or a hydrocarbyl of 1–10 carbon atoms, wherein 0.1–10 —XH groups per 100 monosaccharide units constituting the polysaccharide are replaced by one or more hydrophobic groups represented by the formula (1), namely,

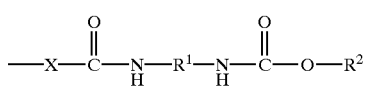

(1)

in which X is the same as given above, $R^1$ denotes a hydrocarbyl having 1–50 carbon atoms and $R^2$ denotes a hydrocarbon group of 12–50 carbon atoms or a steryl group.

5. The process as claimed in claim 4, wherein $R^2$ in the formula (1) denotes a steryl group.

6. The process as claimed in claim 1, wherein the content of the hydrophobic group-containing polysaccharide in the product purified using the solvent based on a ketone is as high as 80% by weight or more.

7. The process as claimed in claim 6, wherein the content of unsubstituted polysaccharide is as low as 20% by weight or less.

8. The process as claimed in claim 6, wherein the product has a content of an impurity product, in which both the two NCO groups in the diisocyanate have reacted with the hydroxyl group-containing hydrocarbon having 12–50 carbon atoms or with the sterol, as low as 0.05% by weight or less.

9. The process as claimed in claim 1, wherein the product purified using a solvent based on a ketone is subjected to a further purification by finely dispersing the product in water under an ultrasonic treatment, with subsequent ultracentrifugal separation.

10. The process as claimed in claim 9, wherein the content of the hydrophobic group-containing polysaccharide in the purified product from the ultracentrifugal separation is as high as 98% by weight or more.

11. The process as claimed in claim 10, wherein the content of unsubstituted polysaccharide is as low as 2% by weight or less.

12. The process as claimed in claim 10, wherein the content of an impurity product, in which both the two NCO groups in the diisocyanate have reacted with the hydroxyl group-containing hydrocarbon having 12–50 carbon atoms or with the sterol, is as low as 0.05% by weight or less.

13. The process as claimed in claim 1, wherein the product purified using the solvent based on a ketone is further subjected to a purification procedures comprising dissolving the product in an aprotic polar solvent, admixing water with the resulting solution to cause the unsubstituted polysaccharide to be transferred to the aqueous phase and removing the aqueous phase, which is separated by phase separation.

14. The process as claimed in claim 13, wherein the further purification of the product purified using the solvent based on a ketone is performed by dissolving the product in the aprotic polar solvent in an amount of 3–50 times the weight of the product and admixing water with the resulting solution in an amount of at least 5 times the weight of the solution.

15. The process as claimed in claim 13, wherein the aprotic polar solvent comprises one or more selected from the group consisting of N,N-dimethyl-formamide, N,N-dimethylacetamide and dimethyl sulfoxide.

16. The process as claimed in claim 13, wherein the content of the hydrophobic group-containing polysaccharide in the purified product purified using the aprotic polar solvent is as high as 98% by weight or more.

17. The process as claimed in claim 16, wherein the content of the unsubstituted polysaccharide is as low as 2% by weight or less.

18. The process as claimed in claim 16, wherein the content of an impurity product, in which both the two NCO groups in the diisocyanate have reacted with the hydroxyl group-containing hydrocarbon having 12–50 carbon atoms or with the sterol, is as low as 0.02% by weight or less.

* * * * *